J. T. PARKS.
NUT-LOCK.
No. 172,824.
Patented Feb. 1, 1876.
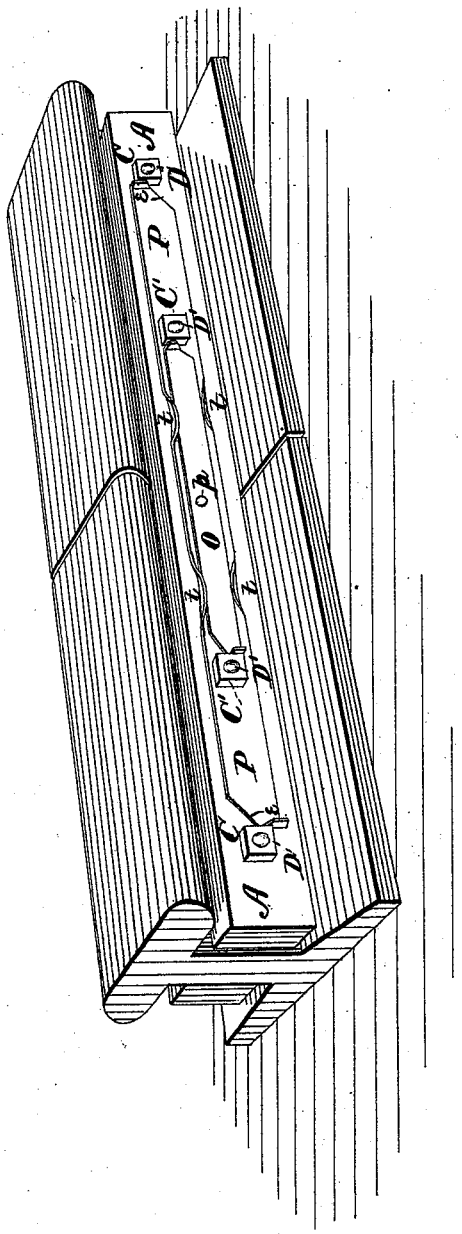
WITNESSES
INVENTOR
John T. Parks
By Hill & Ellsworth
His Attorneys

UNITED STATES PATENT OFFICE.

JOHN T. PARKS, OF EFFINGHAM, ILLINOIS.

IMPROVEMENT IN NUT-LOCKS.

Specification forming part of Letters Patent No. 172,824, dated February 1, 1876; application filed September 1, 1875.

*To all whom it may concern:*

Be it known that I, JOHN T. PARKS, of Effingham, in the county of Effingham and State of Illinois, have invented a new and useful Improvement in Nut-Locks; and I do hereby declare the following to be a full, clear, and exact description of the same, reference being had to the accompanying drawings forming part of this specification, in which the figure represents a perspective view of my invention.

My invention has for its object to provide a cheap, simple, and effective device for securing nuts to bolts, and is designed more particularly for use on fish-plate joints for railroad-rails, although it is generally applicable to all kinds of machinery. It consists in certain improved details of construction, which I will now proceed to describe, and point out in the claims.

In the drawings, A represents the fish-plate, and C C' D D' the nuts and bolts, respectively, all of the usual construction. P represents a plate of metal, preferably of band or hoop iron, provided with orifices near its extremities which allow it to be fitted over the central bolts D', and having beveled ends e, as shown. O is a spring-plate of thin metal pivoted to the plate P at p, adapted to lock the central nuts C' C, and having its ends beveled in the same manner as those of the plate P.

In applying my invention the central nuts C' C' of the fish-plate are removed and the plate P fitted over the bolts, its ends abutting against the face of the end nuts C, and thus securely holding them in position. The plate O is then turned on its pivot out of line with the plate P, and the central nuts C' C' are set up to their places, after which the plate O is moved back to its former position, its ends abutting against and locking the nuts C' C'.

If the nuts, when set up, are in line the ends of the plates P O are upturned, so as to properly lock them in position; but if they happen to stop at an eighth instead of a quarter turn, they are held by the beveled portion, as will be readily understood.

To guard against casual displacement of the spring-plate O, I turn up the edges of the plate P to form ears *t t*, which embrace the edges of the said plate O and prevent its turning.

When it is desired to remove the lock from the nuts the plate O is sprung up by hand far enough to clear the ears *t t*, and the operation above described is reversed.

I claim as my invention—

1. The plates P O, provided with beveled ends *e e*, combined with the bolts and nuts C C' D D', substantially as described.

2. The spring-plate O, pivoted at the center, in combination with the thin metal plate P, adapted to have its edges turned over at *t t* to keep the spring-plate in position, and yet allow it to be sprung out by hand, so as to clear both the turned edges *t t* and the nuts C' C'.

JOHN T. PARKS.

Witnesses:
A. S. MOFFITT,
J. C. BRADY.